May 29, 1934. A. I. PLATT 1,960,507
SERVICE HOLDER FOR MILK BOTTLES
Filed March 8, 1932  2 Sheets-Sheet 1
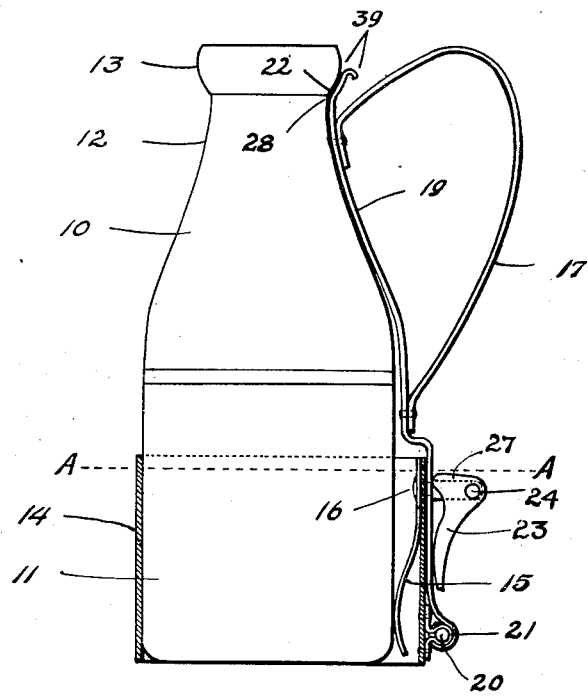
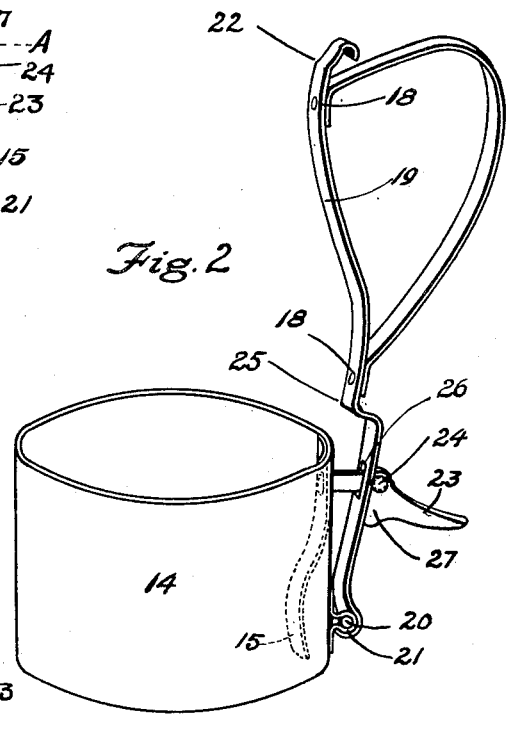
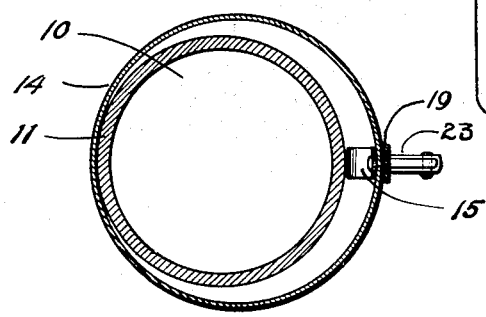
INVENTOR.
BY
ATTORNEY May 29, 1934.  A. I. PLATT  1,960,507
SERVICE HOLDER FOR MILK BOTTLES
Filed March 8, 1932  2 Sheets-Sheet 2
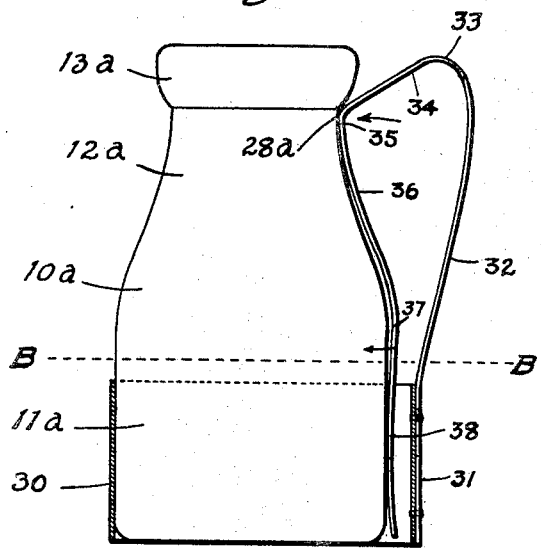
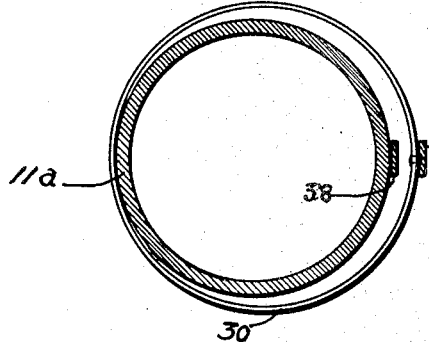
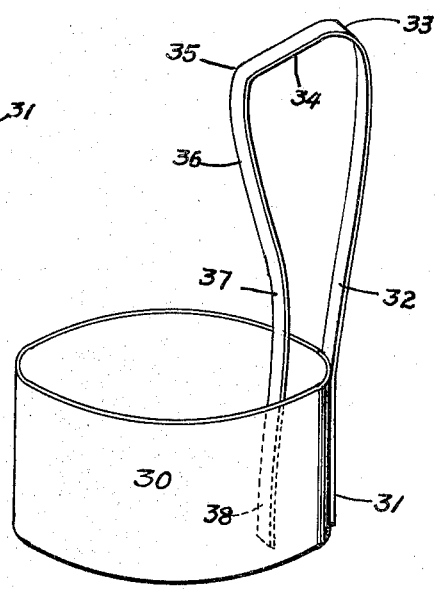
INVENTOR.
Arthur I. Platt
BY 
ATTORNEY Patented May 29, 1934

1,960,507

UNITED STATES PATENT OFFICE 1,960,507

SERVICE HOLDER FOR MILK BOTTLES

Arthur I. Platt, Fairfield, Conn.

Application March 8, 1932, Serial No. 597,471

11 Claims. (Cl. 215—100)

This invention relates to means for holding bottles in use, and particularly, to means for holding milk or cream bottles, so that these may be used on the table as pitchers.

An object of this invention is to provide a simple and efficient service holder for bottles having a handle by means of which the bottle may be manipulated conveniently in use.

An important feature of the present invention is the provision of a holder which is adapted for use with bottles of varying sizes and which nevertheless securely holds the bottle for manipulation by the handle forming part of the holder.

Two embodiments of the present invention are illustrated herein—one being designed for use with quart-size milk bottles while the other is especially adapted for use with pint or half-pint bottles, such as are used for milk and cream. This latter embodiment of the invention is extremely simple and consists merely of a collar for encircling the bottom portion of the bottle and a single strip of resilient material fastened to the collar forming a handle, and also constituting means for preventing movement of the bottle longitudinally of the collar.

Other features and advantages will hereinafter appear.

In the accompanying drawings—

Figure 1 is a vertical sectional view of my improved service holder for milk bottles, showing in elevation a bottle held thereby.

Fig. 2 is a perspective view of the bottle holder shown in Fig. 1.

Fig. 3 is a horizontal sectional view taken on the line A—A of Fig. 1.

Fig. 4 is a view similar to Fig. 1, of another embodiment of this invention.

Fig. 5 is a perspective view of the bottle holder shown in Fig. 4.

Fig. 6 is a horizontal sectional view taken on the line B—B of Fig. 4.

Referring now to the form of the invention shown in Figs. 1 and 3, the holder is especially adapted to support large heavy bottles such as the quart-size milk bottle 10 shown in the drawings. This bottle, as is usual, has a bottom portion 11, a tapering neck 12, and a bead 13 at the mouth of the bottle.

The holder of the present invention comprises a collar 14, which preferably is not closed at the bottom, although it may be according to some aspects of this invention. This collar 14 has an internal circumference of such dimension that bottles having lower portions 11 of various circumference may be used; and, in this form of the invention, to hold the collar 14 firmly against the bottom portion 11 the collar is provided with a spring 15 located between the bottle and one side of the collar, and secured to the latter by rivets or screws 16.

The holder also comprises a handle 17. In the form of the invention shown in Figs. 1, 2 and 3, the handle 17 consists of a strip of metal suitably shaped and riveted at 18 to a vertical strap 19, the lower end of which is curled about a pin 20 forming a fulcrum and held in loops 21 formed on or secured to the collar 14 near the bottom edge thereof.

It is on this pin 20 that the parts 17 and 19 constituting the handle may be moved outwardly to permit the bottle 10 to be inserted in the collar 14. After this is done, the strap 19 may be swung on its pivot to bring its upper end 22 into engagement with the bottle by means of a lever 23 pivoted at 24 on an arm 25 secured to the collar 14 and passing through an elongated hole 26 in the strap 19. The lever 23 has a cam surface 27 so that when the lever is swung downwardly the cam lever presses against the strap 19 and pushes it toward the axis of the collar 14. The arm 25, passing through the slot 26, assists the hinge connection 20—21 in holding the strap vertically.

When the strap 19 is thus moved toward the bottle, its upper end 22 engages the bottle at the junction 28 of the tapering neck 12 and the bead 13 of the bottle and is shaped to snugly fit in the junction 28. When thus engaged the portion 22 of the strap resists any tendencies for the bottle to move outwardly of the collar 14 in either direction, and thus firmly holds the handle 17 to the bottle. The upper end 29 of the strap 19 may be rolled as shown to avoid presenting a sharp edge by which a person using the bottle and holder might be injured.

The material of which the strap 19 is formed is somewhat resilient and is placed under tension when engaged with the bottle, as shown in Fig. 1, thereby maintaining the lever 23 in its locking position. This resiliency of the strap 19 also permits it to accommodate itself to variations in the shapes of the bottles with which it is to be used.

In Figs. 4, 5 and 6, an embodiment of this invention is illustrated which is particularly adapted for smaller bottles, and, where it may be used, it is preferable to the form shown in Figs. 1 and 3, due to its extreme simplicity. It is especially adapted for use with pint and half-pint milk and cream bottles.

The bottle 10a represented in Figs. 4 and 5 has a bottom portion 11a, a tapering neck 12a and a bead 13a at its mouth.

The holder comprises a collar 30 at one side of which is secured a metal strap 31. This metal strap has a portion 32 rising vertically and outwardly and forming a hand grip. At the top 33 it is curved and has a portion 34 bent downwardly and toward a position to engage the bottle. At the end of the portion 34 is a bend 35 which is adapted to engage the junction 28a of the tapering neck 12a with the bead 13a of the bottle.

Preferably, but not essentially, the portion 36 of the strap below the portion 35 follows the general contour of the tapering neck 12a of the bottle and below this a straight portion 37 of the strap is adapted to engage one side of the bottle.

The material of which the strap 31 is formed is resilient and is so biased that when the bottle is in position in the holder, as shown in Fig. 4, the portion 35 engages the tapering neck 12a and bead 13a and resists any tendency of the bottle to move outwardly of the collar 30 in either direction. The portion 37 of the strap 31 is so biased as to press against the side of the bottle 10a and urge the lower portion 11a thereof against the part of the collar 30 which is opposite the strap 31 and thereby clamp the bottle in the collar 30.

The collar 30 is preferably made large enough to take bottles of various diameters, and this provision may be made because the portion 37 of the strap constantly urges the bottle against the opposite side of the collar.

It is also preferable that the portion 37 of the strap have an extension 38 which reaches down into the collar 30 and is interposed between the portion 11a of the bottle and the adjacent portion of the collar 30, thereby applying pressure to the bottle at a point directly opposite the front portion of the collar.

It should be observed that the holder shown in Figs. 4, 5 and 6 consists of the simple collar 30 and the formed strap 31 which may be fastened to the collar by riveting or spot-welding in a very economical manner.

In placing the bottle in the holder, as shown in Figs. 4, 5 and 6, the bottle may be introduced upwardly through the collar, in which event the portion 35 springs past the bead 13a as the bottle reaches its final position in the holder; or, the bottle may be inserted from the top, in which event the strap 31 is pulled outwardly by hand so as to allow the larger part 11a of the bottle to pass downwardly into final position, whereupon the strap 31 springs toward the bottle and the portion 35 engages the junction 28a in the neck 12a with the bead 13a.

The collars 14 (Fig. 1) and 30 (Fig. 4) may be ornamented or decorated in any way desired or it may carry printed matter advertising the products of the company with whose bottles the holder is intended for use. In this latter event the holders being inexpensive may be furnished to users free or as a premium.

The embodiments of the invention illustrated herein are not only adapted to accommodate themselves to bottles of various diameters but also to bottles of various heights. This is so because the means which prevents movement of the bottle outwardly of the holder is the part 22, in the form shown in Fig. 1, and the part 35 in the form shown in Fig. 4. The holder will, as a consequence, locate itself on the holders with these parts 22 and 35 engaging the junctions 28 and 28a respectively in the two forms of the invention shown, and, should the bottle employed be unusually tall it would simply mean that the bottom edge of the collars 14 and 30 respectively would be raised correspondingly from the bottom edge of the bottle. Likewise, if the bottle is unusually short, the bottom edge of the collars 14 and 30 respectively will project beyond the bottom edge of the bottle. The means which holds the collars 14 and 30 respectively, of the two embodiments of this invention to the bottles, namely the parts 15 and 38, is such as to properly function regardless of whether or not the bottom edge of the bottle is in line with the bottom edge of the sleeve 30.

As stated before, the collars 14 and 30 may have bottoms, but, when it is desired to have the holder fit bottles of various heights, the bottom is preferably omitted for the above-stated reasons.

Variations and modifications may be made within the scope of this invention and portions of the improvements may be used without others.

Having thus described the invention, what is claimed as new and for which it is desired to obtain Letters Patent is:—

1. A service holder for bottles having a collar for encircling the bottom part of a bottle; a handle connected to the collar and extending upwardly from the collar; means at the upper part of the handle for engaging the bottle at the junction of the neck with the bead at the mouth of the bottle; and means interposed between the collar and the bottle at one side thereof and resiliently urging the bottle against the opposite side of the collar.

2. A service holder for bottles having a collar for encircling the bottom part of a bottle; a handle connected to the collar and extending upwardly from the collar; means at the upper part of the handle for engaging the bottle at the junction of the neck with the bead at the mouth of the bottle; means interposed between the collar and the bottle at one side thereof and resiliently urging the bottle against the opposite side of the collar, said handle being pivotally mounted on the collar for movement toward and from the bottle; and manually operable means carried by the collar for moving the upper part of the handle into engagement with the bottle.

3. A service holder for bottles having a collar for encircling the bottom part of a bottle; a handle connected to the collar and extending upwardly from the collar; means at the upper part of the handle for engaging the bottle at the junction of the neck with the bead at the mouth of the bottle; means interposed between the collar and the bottle at one side thereof and resiliently urging the bottle against the opposite side of the collar, said handle being pivotally mounted on the collar for movement toward and from the bottle; and a lever having a cam to engage said handle and move the same toward the bottle to clamp the upper part of the handle against the bottle and in contact with the same at the junction of the neck with the mouth of the bottle.

4. A service holder for bottles having a collar for encircling the bottom part of a bottle; a handle connected to the collar at one side thereof and extending upwardly from the collar; means at the upper part of the handle for engaging the bottle at the junction of the neck with the bead at the mouth of the bottle; and an arm integral with the handle and extending downwardly along the side of the bottle and adapted to resiliently urge the bottle against the side of the collar opposite said arm.

5. A service holder for bottles having a collar for encircling the bottom part of a bottle; a handle connected to the collar at one side thereof and extending upwardly from the collar; means at the upper part of the handle for engaging the bottle at the junction of the neck with the bead at the mouth of the bottle; and an arm on the handle extending downwardly substantially parallel with the side of the bottle and interposed at its lower end between the bottle and the collar to resiliently urge the bottle against the side of the collar opposite said arm.

6. A service holder for bottles having a collar for encircling the bottom portion of a bottle; and a strip of resilient material secured to the collar at one side thereof extending upwardly from the collar and forming a handle portion spaced from the bottle, the upper portion of said strip being bent toward the bottle and being shaped to engage the bottle at the junction of the neck with the bead at the mouth of the bottle, said strip from said junction extending downwardly along the side of the bottle and being adapted to resiliently urge the bottle against the side of the collar opposite to the strip.

7. A service holder for bottles having a collar for encircling the bottom portion of a bottle; and a strip of resilient material secured to the collar at one side thereof extending upwardly from the collar and forming a handle portion spaced from the bottle, the upper portion of said strip being bent toward the bottle and being shaped to conform to the contour of the bottle from a point above the junction of the bead with the neck of the bottle and along the neck and body of the bottle and extending downwardly along the side of the bottle and being adapted to resiliently urge the bottle against the side of the collar opposite to the strip.

8. A service holder for bottles having a collar for encircling the bottom portion of a bottle; and a strip of resilient material secured to the collar at one side thereof extending upwardly from the collar and forming a handle portion spaced from the bottle, the upper portion of said strip being bent toward the bottle and being shaped to engage the bottle at the junction of the neck with the bead at the mouth of the bottle, said strip from said junction extending downwardly along the side of the bottle and being adapted to resiliently urge the bottle against the side of the collar opposite to the strip, the collar being made large enough in diameter to fit bottles of various sizes, and said strip which extends downwardly along the side of the bottle being interposed between the bottle and the collar to resiliently compensate for the differences in sizes of the bottles used with the service holder.

9. A service holder for bottles having a collar encircling the bottom portion of a bottle; and a strip of resilient material secured to the collar at one side thereof extending upwardly from the collar and forming a handle portion spaced from the bottle, the upper portion of said strip being bent toward the bottle and being shaped to conform to the contour of the bottle from a point above the junction of the bead with the neck of the bottle and along the neck and body of the bottle and extending downwardly along the side of the bottle and being adapted to resiliently urge the bottle against the side of the collar opposite to the strip, the collar being made large enough in diameter to fit bottles of various sizes, and said strip which extends downwardly along the side of the bottle being interposed between the bottle and the collar to resiliently compensate for the differences in sizes of the bottles used with the service holder.

10. A service holder for bottles having a handle; means at the lower end of the handle for holding the latter in predetermined position with relation to the bottle; and means at the upper end of the handle adapted to engage the bottle on one side only thereof at the junction of the neck with the bead at the mouth of the bottle and adapted to resist movement of the bottle upwardly with relation to the handle by reason of its engagement with the wider portion of the neck of the bottle and to resist downward movement of the bottle relative to he handle by reason of its engagement with the bead at the mouth of the bottle, said handle being pivotally mounted on the means for attaching its lower end to the bottle and having releasable means to permit it to move to a position allowing the bead to pass by when inserting the bottle in the holder and also permitting assembling the bottle thereof in a straight line direction from the top thereof.

11. A service holder for bottles having a collar for encircling the bottom part of a bottle; a handle connected to the collar at one side thereof and extending upwardly from the collar; means at the upper part of the handle for engaging the bottle at the junction of the neck with the bead at the mouth of the bottle; and means interposed between the collar and the bottle and resiliently urging the bottle against the opposite side of the collar, said collar being slidable over the bottle and being adapted to engage the bottle more or less close to the bottom edge of the latter depending upon the height of the bottle.

ARTHUR I. PLATT.